March 29, 1966  A. H. FLATER  3,242,665
COMPOUND TURBINE ENGINE

Filed July 12, 1963  6 Sheets-Sheet 1

INVENTOR:
ANDERS H. FLATER
BY Marshall, Johnston, Cook & Root
ATT'YS

March 29, 1966  A. H. FLATER  3,242,665
COMPOUND TURBINE ENGINE
Filed July 12, 1963  6 Sheets-Sheet 2

INVENTOR:
ANDERS H. FLATER
BY Margall, Johnston, Cook & Root
ATT'YS

March 29, 1966  A. H. FLATER  3,242,665
COMPOUND TURBINE ENGINE

Filed July 12, 1963  6 Sheets-Sheet 3

INVENTOR:
ANDERS H. FLATER
BY Marshall, Johnston, Cook & Root

ATT'YS

March 29, 1966 A. H. FLATER 3,242,665
COMPOUND TURBINE ENGINE
Filed July 12, 1963 6 Sheets-Sheet 4

FIG. 8(a) COMBUSTION

FIG. 8(b) POWER EXHAUST

FIG. 8(c) INTAKE

FIG. 8(d) COMPRESSION

FIG. 9

INVENTOR:
ANDERS H. FLATER
BY Margall, Johnston, Cook & Root
ATT'YS

March 29, 1966  A. H. FLATER  3,242,665
COMPOUND TURBINE ENGINE
Filed July 12, 1963  6 Sheets-Sheet 5

INVENTOR:
ANDERS H. FLATER
BY
ATT'YS

March 29, 1966 — A. H. FLATER — 3,242,665
COMPOUND TURBINE ENGINE
Filed July 12, 1963 — 6 Sheets-Sheet 6

INVENTOR:
ANDERS H. FLATER
BY
ATT'YS

United States Patent Office 3,242,665
Patented Mar. 29, 1966

3,242,665
COMPOUND TURBINE ENGINE
Anders Harold Flater, Uccle, Brussels, Belgium
(105/110 Muallim Naci Cad., Ortakoy, Istanbul, Turkey)
Filed July 12, 1963, Ser. No. 295,602
3 Claims. (Cl. 60—13)

This application is a continuation-in-part of my copending application Serial No. 220,804, filed August 31, 1962, now abandoned.

The present invention relates, in general, to compound turbine engines, and has more particular reference to improvements in structures in which a turbine is driven by exhaust gases mixed with air from a piston-type, internal combustion engine. In one of its refinements, the turbine is employed to replace and perform the functions of the cam shaft, cam operated intake and exhaust valves, flywheel, and exhaust and intake manifolds of the common internal combustion engine. The turbine may provide a torque to an output shaft of its own or to the shaft of the internal combustion engine.

Gas turbine engines operate on a constant pressure principle, i.e., the turbine is driven by the expansion of a constant, continuous gas stream against the turbine vanes. The turbine drives an air compressor a well as providing useable power. The main function of the compressor is to provide an air stream for mixing with the combustion gases to cool the latter to temperatures within the metallurgical heat limits of the turbine parts. Gas turbines have many practical uses, but also have several shortcomings which may be overcome by the compound turbine engines of this invention. For example, gas turbines will not operate at low speeds because high speed operation is needed to operate the compressor. Hence, the usual gas turbine cannot be adapted easily to automotive uses.

An important object of the iinvention is to provide a compound turbine engine advantageously using a turbine in conjunction with a piston-type, internal combustion engine; a further object being to utilize with an internal combustion engine of the aforesaid character a turbine operated by the expansion of exhaust gases from the cylinders of a piston-type, internal combustion engine; a further object being to utilize a piston-type, internal combustion engine to provide an air-combustion gas mixture to operate a turbine; a still further object being to provide a compound turbine engine combining certain features of a gas-operated turbine and a piston-type, internal combustion engine in a novel and advantageous manner.

Another important object of the invention is to provide a compound turbine engine providing substantially unrestricted expansion of exhaust gases to drive a turbine and promote high thermal efficiency in engine operation; another important object being to provide a compound turbine engine operable with high torque and low engine speed; a still further important object of the invention being to provide a compound turbine engine of simplified design in terms of moving parts required to operate the engine; another object of the invention being to provide a compound engine which can be manufactured at low engine cost and weight per unit horsepower; while still other important objects of the invention relate to improvements in compound turbine engines operating with two-cycle, piston-type, internal combustion power plants, to compound turbine structures capable of applying torque to the output shaft of the engine and also provide a valve function in the operation of the engine, and to internal combustion engines utilizing a pressure regulator piston functioning in tandem and in a different phase with each combustion piston for leveling the pressure of combustion exhaust gases over a cycle of engine operation for mixing excess air with hot combustion gases to cool the latter prior to their being exhausted against vanes of the turbine and also for aiding in scavenging combustion gases from the power cylinder during the exhaust portion of the engine cycle.

A still further object of the invention is to provide a compound turbine engine structure in which the engine power applied to a drive shaft may come substantially entirely from the turbine in one type engine design, substantially entirely from the piston drive in another type engine design, or from both the power drive pistons and the turbine in a still further type engine design.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Briefly, the compound turbine engines of the invention are engines in which the exhaust gases of piston-type, internal combustion engines are utilized to drive a turbine. The turbine may be connected to the same drive shaft as the drive shaft of the piston-type, internal combustion engine or it may be connnected to another drive shaft. Certain advantages, however, are achieved by engine construction in which the drive pistons and the turbine are connected to the same drive shaft.

Some of the advantages of the compound turbine engines of the invention, particularly with relation to known gas turbine engines, are the applicability of the former in automotive uses with conventional transmissions, low specific fuel consumption, high torque, easy starting, and low cost of manufacture per unit of horsepower.

The compound turbine engines of the invention are designed in such a way that they will transform uneven exhaust gas pressures, which are inherent in the intermittent combustion cycle, into more constant pressures suitable for turbine operation. The dampening factor for effecting such transformation lies in the precompression of excess air which varies in time with the combustion cycle to provide an acceptably low temperature of the gases at the desired pressure for the turbine drive. The scavenging of combustion products from the combustion cylinders of the engine is achieved, without precompression of the intake air, by means of synchronized pressure regulator cylinders operated in tandem with the combustion cylinders. The regulator cylinders evacuate residual gases in the combustion chambers.

To illustrate the invention in terms of a specific embodiment thereof, the drawings show a compound turbine engine 1 comprising a crankcase 2. The crankcase is made up of an end wall 3, and end wall 4, and a middle wall 5, the latter wall dividing the crankcase into a first compartment 6 and a second compartment 7. The crankcase has extending outwardly therefrom at least one, and in the illustrated case four, radially disposed side-by-side cylinders 8 and 9. Each cylinder 8 is a power cylinder and each cylinder 9 is a pressure regulator cylinder operating in tandem with the respective power cylinder. For compactness, it is preferred to mount the pairs of cylinders 8 and 9 in close side-by-side relationship, although it is recognized that other spatial arrangements of the cylinder pairs may be employed without departing from the principles of the invention.

Each power cylinder 8 is mounted on the crankcase 2 in alignment with the crank arm 11 of the crankshaft 10. The throw of the crank arm 11 is connected via the connecting rod 12 to power pistons 13. The structure of the power pistons, crank arm and connecting rods may be of the type which is well known in the art. The pistons 13 have the usual oil-seal, piston rings 14.

Crankshaft 10 is journalled in the crankcase in crankshaft bearings 15 provided in the walls 3, 4 and 5. In the chamber 7 of the crankcase, the crankshaft carries a crank arm 16. The throw of the crank arm 16 is connected via connecting rods 17 with the pressure regulator pistons 18, the latter having piston rings 19. The pressure regulator pistons 19 apply no power or torque to the crankshaft 10, but rather are driven by the crankshaft in timed relationship to the reciprocal movement of the power pistons 13. Fuel is injected into the combustion cylinders 8 by means of fuel injectors 20. In a gasoline type engine, spark igniters, e.g., spark plugs (not shown) may be provided in the combustion cylinders 8. In the latter instance, carburetor feed of the gasoline may be used in lieu of the fuel injectors 20. Furthermore, the combustion cycle for the engine may be the conventional diesel-type combustion cycle of constant volume-pressure.

Air is drawn into the compound turbine engine by means of a centrifugal fan 21 mounted on and rotated by crankshaft 10. This precompressor impeller creates a centrifugal compression of the intake air which flows into the engine between the diffuser vanes 22. The air flows through the cylinder jackets 23 in the air passages 24, 26 formed between the side walls of the jacket and the side walls of the cylinders and the top wall of the jacket cap 27 and the top wall 28 of the cylinders, respectively.

Each pair of cylinders 8, 9 are interconnected through their side walls by means of a tube 30 forming a port in the side wall of each cylinder 8, 9 of the cylinder pairs. Each of the power cylinders 8 may have air intake ports in the side walls of the cylinders. The ports 31 are positioned slightly above the top of the cylinders 13 when the latter are in their bottommost position. The pressure regulator cylinders 9 each may also have similarly positioned ports 32 through which excess air may be drawn into the pressure regulator cylinders when the ports 32 are uncovered when the piston is at and near the bottom of its stroke.

Each pressure regulator cylinder 9 has adjacent its outer end a tube or passage 33 through which gases are exhausted from the pressure regulator cylinder 9. It is these gases which are used to drive the turbine. The tubes or passages 33 may have bleed holes 34 communicating with the air passages 24, 26 through which air may flow into the tubes or passages 33.

Figure 4:
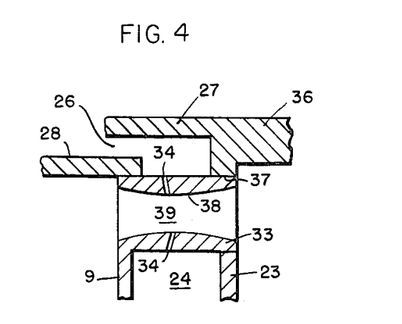
FIG. 4 is a fragmentary view, in cross-section, of the structure at the exhaust port of a pressure regulator cylinder.

The structure of the engine adjacent the tubes or passages 33 is shown in detail in FIG. 4. The caps 27 for the jackets 23 may be made integral with a ring 36 which forms the outer, cylindrical wall of the turbine housing. The ring 36 may be made integral with the circular wall 29 which forms one side wall of the turbine housing. This wall 29 may be formed integrally with the jackets 23 and has therein holes 37 through which extend the tubes 33.

The inner wall 38 of the passages 33 is curved to provide a passage 39. The bleed holes 34 communicate with the passage 39 at approximately the throat of the passage.

Figure 5:
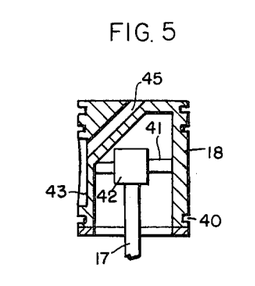
FIG. 5 is a cross-sectional view of a piston of the pressure regulator piston.

The pistons 18 for the pressure regulator cylinders 9 are shown in detail in FIG. 5. These pistons have ring grooves 40 for accommodating piston rings. The piston is hollow and has mounted therein a journal pin 41 on which is rotatably journalled a bearing 42 of the connecting rod 17. The cylindrical face of the piston which reciprocates opposite the port in the wall of the cylinder 9 provided by the tube 30 has a longitudinal groove 43. A diagonal passage 45 extends between the vertical slot 43 and the outer end of the piston 18. The slot 43 and the passage 45 are exhaust gas passages through which exhaust gases are discharged through the tubes 30 and may flow into the pressure regulator cylinder 9.

The turbine of the compound turbine engine of the invention is, in the illustrated embodiment, a flywheel-valve turbine 44. In addition to the usual turbine function, the turbine 44 may serve as the flywheel for the piston-type, internal combustion engine when the turbine is mounted on the crankshaft 10. Additionally, the structure of the turbine may be such that it will perform a valve function in the selective opening and closing of the gas discharge tubes or passages 33.

The combustion piston and pressure regulator piston of each pair reciprocate in substantially opposite phase. The cycle of one may be in exact opposite phase to the other, or there may be a lag or lead from opposite phase of up to about 15–35°.

Figure 6:
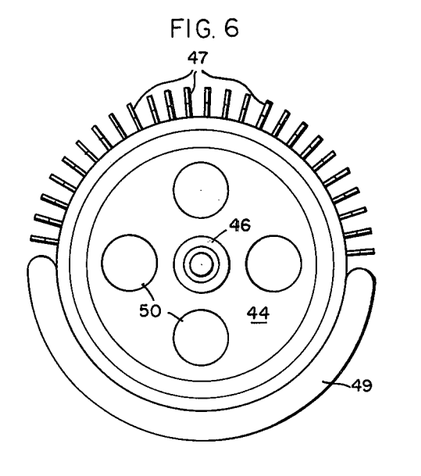
FIG. 6 is a side elevation of the turbine used in the embodiment of FIG. 1.
Figure 7:
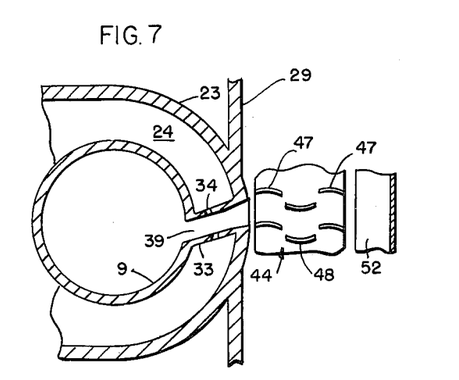
FIG. 7 is a fragmentary, sectional view taken through the pressure regulator cylinder and its exhaust port and further showing the relationship of the turbine vanes and stator vanes of the turbine structure.

As will be seen from FIG. 6, the turbine comprises a hub 46 which is splined or otherwise suitably mounted on the crankshaft 10. The turbine 44 carries on its outer edge a series of vanes 47 which extend about the turbine approximately one-half of its circumference. The turbine vanes 47 are curved vanes arranged in pairs adjacent each edge of the turbine wheel. These vane pairs travel past stator vanes 48 fixedly mounted on the ring 36 and have a curvature opposite the curvature of the turbine vanes 47.

The other half of the circumference of the turbine wheel 44 comprises a semi-circular valve plate 49 which travels in contact with or in very close proximity to the outer ends of the tubes 33. The valve plate 49 closes off the gas flow through the tubes 33 when it is opposite the plates. If desired, the mass of the turbine wheel 44 can be lessened by holes 50 provided therein.

Figure 1:
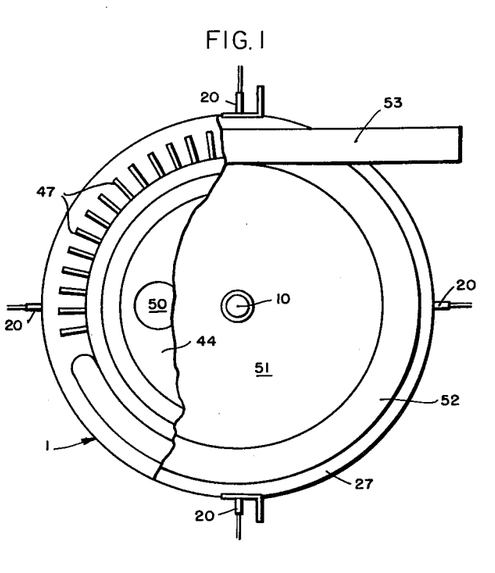
FIG. 1 is a rear elevation, with a portion of the cover plate broken away to show the turbine structure, of a compound turbine engine of the invention.
Figure 2:
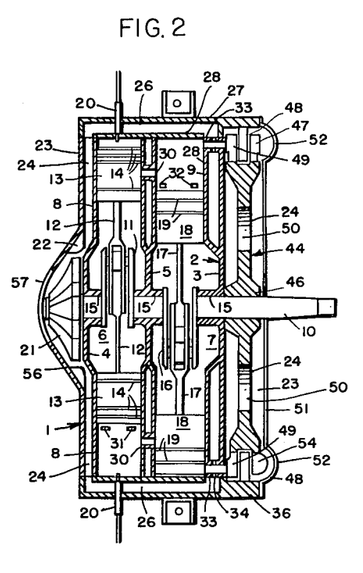
FIG. 2 is a diametric cross-sectional view of the embodiment of FIG. 1.
Figure 3:
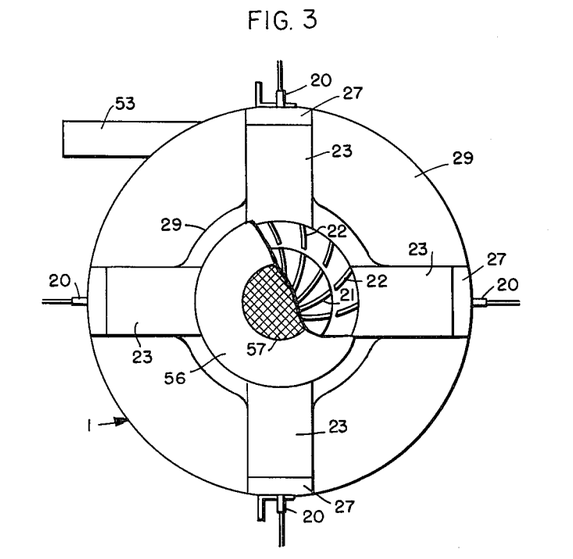
FIG. 3 is a front elevation of the compound turbine of FIG. 1, with a small portion broken away to facilitate illustration of the invention.

The outer end of the turbine housing is closed by a cover plate 51. The cover plate 51 is bent outwardly around its peripheral edge to provide a semi-circular passage 52 for the flow of exhaust gases. The passage 52 communicates with an exhaust tube or pipe 53 and spent gases in the turbine housing are pushed through the passage 52 by the pusher vane 54 and impelled through exhaust pipe 53. The precompressor impeller 21 is housed in a conical air intake housing 56 which may be covered by a screen 57 (FIG. 3).

The combustion-exhaust cycle of the power cylinder and pressure regulator cylinder is shown diagrammatically in FIGS. 8(a) through 8(d).

The compound turbine operates in the following manner. When the combustion cylinder piston 13 reaches the outer end of its stroke, the position illustrated in FIG. 8(a), a charge of fresh air previously supplied to the cylinder has been compressed therein. The fuel is injected into the combustion cylinder 8 through the fuel injector 20. The fuel-air mixture then fires, driving the piston 13 inwardly on its power stroke to rotate the crankshaft 10.

Figure 8A:
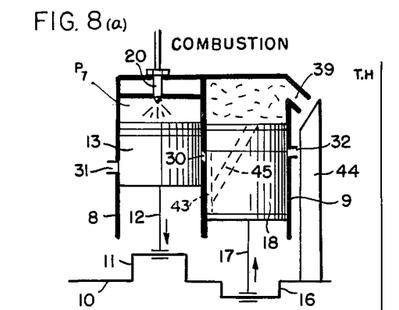
FIGS. 8(a), 8(b), 8(c) and 8(d) are diagrammatic illustrations of a power cylinder and a pressure regulator cylinder showing their tandem operation in the following cycles, respectively: (a) combustion, (b) power-exhaust, (c) fuel intake and (d) fuel compression.
Figure 8B:
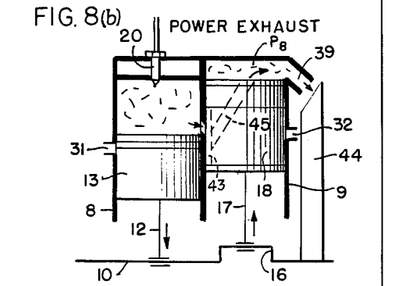
Figure 8C:
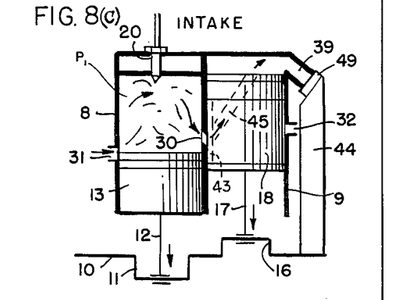

When the piston 13 is at the outer end of its stroke, the piston 18 for the pressure regulator cylinder 9 is near the inner end of its stroke. As the piston 18 is driven by the crankshaft 10 toward its upper or outer end of its stroke, it compresses air in the cylinder 9. When the semi-circular metal plate 49 on the turbine 44 moves past the outlet end of the discharge tube or nozzle 39, the gas mixture is discharged against and drives the turbine 44.

The combustion gases of the power piston 8 exert a driving pressure against the piston 13 until the outer end of the piston 13 clears the port or passage 30. At this stage, the combustion gases enter the vertical slot 43 in the pressure regulator piston 18 and flow through the diagonal passage 45 in the body of the piston 18 into the pressure regulator cylinder 9. These gases mix with the cooler excess air in the pressure regulator cylinder 9 and are discharged through the passage or nozzle 39 against the vanes of the turbine 44. The expansion of the combustion gas-air mixture drives the turbine.

When the combustion or power piston 13 reaches the inner end of bottom of its stroke, it has unblocked the intake port or ports 31 so that air is drawn into the combustion cylinder 8. At this stage of the cycle, the pressure regulator piston 18 has begun its downward stroke and the valve plate 49 has closed off the tube or nozzle 39. This creates a lower pressure in the pressure regulator cylinder 9 so that air is drawn through the port 31 into the combustion cylinder 8. This air washes out or scavenges residual combustion products in the cylinder 8, and the resultant gas mixture is drawn into the pressure regulator cylinder 9.

Figure 8D:
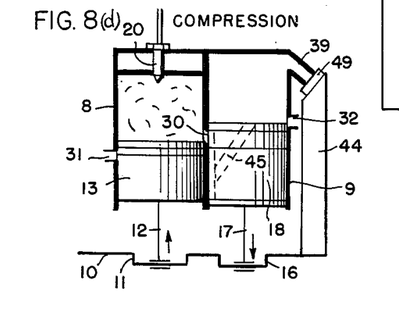

When the combustion piston 13 begins its upward or outward stroke, it closes off the air intake port or ports 31. This begins the compression cycle for the air in the combustion cylinder 8. This position is shown in FIG. 8(d), at which position the port 30 is blocked by the pressure regulator piston 18. This blocking results from the fact that the vertical slot 43, at this stage of the cycle, does not communicate with the port 30.

The pressure regulator piston 18 continues to block the port 30 at least until such time as the combustion piston 13 has moved upwardly or outwardly a sufficient distance so that it blocks the port 30. The compression cycle is continued under upward or outward movement of the power piston 13 until the combustion stage is reached as shown in FIG. 8(a). The pressure regulator piston 18 bottoms when the combustion piston 13 is near the beginning of its compression cycle. If desired, a port or ports 32 may be provided in the wall of the pressure regulator cylinder 9 so that additional air can be drawn into the cylinder 9 at this stage of the cycle.

It will be seen from the foregoing description of the operation cycle that the pressure regulator piston 18 performs the functions of evening out the pressure of the gases discharged through the tube of nozzle 39 against the turbine 44. When the nozzle 39 is unblocked by the semi-circular valve plate 49, it provides a mixing function between the hot combustion gases and the cooler air drawn into the pressure regulator cylinder at or near the inner end or bottom of the stroke of the piston 18 to provide a gas temperature which will not be deleterious to the metal components of the turbine or the turbine housing, and provides a valve function during the power exhaust and intake stages of the engine cycle. The compound turbine engine of the invention will operate with one combustion cylinder and one pressure regulator cylinder, although it will be apparent that a more continuous flow of gases to the turbine will be provided by engines utilizing two or more power cylinders and pressure regulator cylinders operating in tandem pairs according to the cycle described above.

The turbine 44 may be drivingly connected to the crankshaft 10, in which case it serves also as the flywheel for the piston operation of the engine. The turbine also advantageously provides the valve function in opening and closing the tubes or nozzles 39 at the desired time, although it is recognized that other valve means such as cam-operated valves or the like could be used in lieu of the valve plate 49 on the turbine. It is, furthermore, within the contemplation of the invention to mount the turbine 44 on a shaft separate from the crankshaft 10 so that the output power of the turbine is delivered independently from the output power of the crankshaft 10. There are numerous advantages in mounting the turbine 44 on the crankshaft 10, however, one of the most important of which is that the force of gas expansion against the turbine blade provides a substantially continuous rotational force on the crankshaft 10 with relatively high torque, the latter being the result of the relatively large diameter of the turbine as compared with the smaller diameter of the arc of the throw of the crank 11. This relatively high torque provided by the turbine provides smoother engine operation at low speeds than would be the case if the turbine were absent or were connected to a separate power output shaft.

The stationary vanes 48 are employed in conjunction with the turbine 44 to increase the gas pressure at the turbine stage of the engine operation. The bleed holes 34 in the gas discharge tubes or nozzles 33 may be used to supply additional amounts of cool air to the hot gases before they come into contact with the turbine and its housing.

In the embodiment of the invention previously described, the piston drive and the turbine drive on the crankshaft 10 both contribute to the total power output of the engine through the utilization of the explosive force of the fuel-air mixture in the power cylinders and the subsequent utilization of the expansion of the combustion gases against the turbine vanes. It is possible, however, to vary the timing in the sequence of the tandem operations of the power cylinders and pressure regulator cylinders so that the explosive force of the fuel-air mixture applies its power in driving the combustion cylinder 13 for a shorter period in the engine cycle, whereby the piston portion of the engine applies its power to the crankshaft in an amount just sufficient to keep the pressure regulator cylinders functioning. In such operation, the combustion gases will be discharged into the pressure regulator cylinders and thence to the turbines at higher pressures, and the output power of the compound turbine will come essentially entirely from the turbine portion of the engine.

Figure 9:
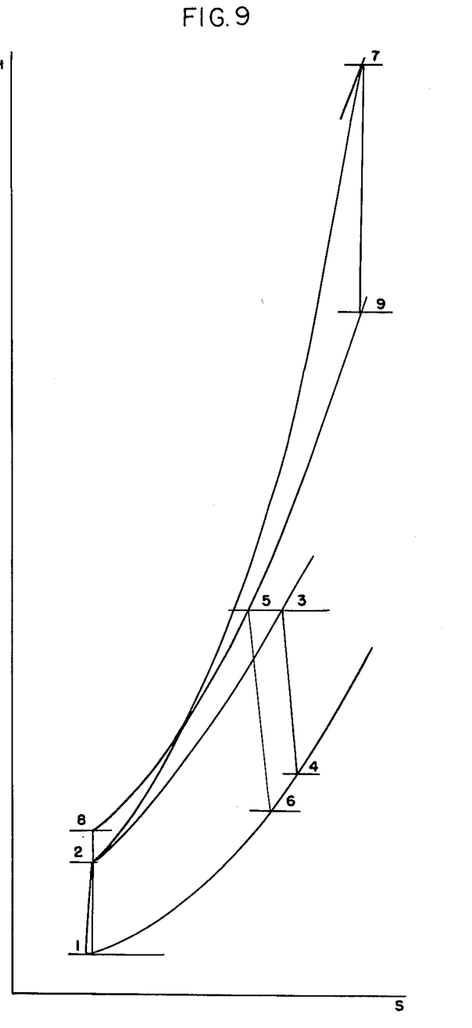
FIG. 9 is a T-S diagram with curves for the cycle of an ordinary internal combustion, piston-type engine and for a compound turbine engine of the invention.
Figure 10:
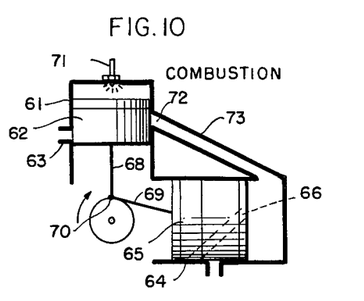
FIG. 10–13 are diagrammatic illustrations of another arrangement of a power cylinder and pressure regulator cylinder in the cycles, respectively, of combustion, power-exhaust, fuel intake, and fuel compression.
Figure 11:
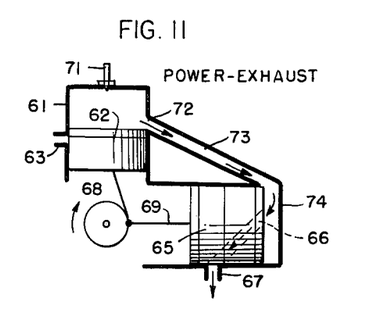
Figure 12:
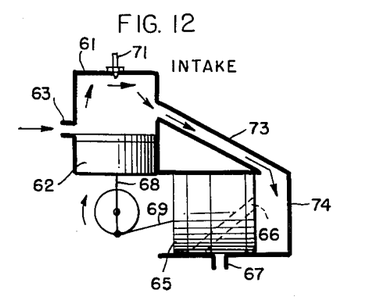
Figure 13:
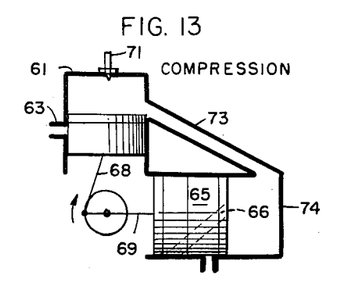

The T–S diagram of FIG. 9 shows a comparison of the improvements in thermal efficiencies between a compound turbine engine of the character illustrated in the drawings and described heretofore, which features constant volume combustion of the fuel-air mixture with excess air pressure generation and a conventional constant pressure turbine, i.e., a conventional gas powered turbine. In the illustrated case, the compound turbine engine is looked upon as a low compression ratio turbine. The work of the piston portion of the engine is calculated to be exclusively for the compression of air and its power is not used by the turbine work shaft. Precompression of the intake air is not essential to the engine operation.

Admittedly, there is a certain flexibility in the choice of combustion cycles and compression ratios which may only be determined by actual tests. However, in order to demonstrate some of the aspects of the engine, I have included the following brief evaluations.

FIGURES 8(a) to 8(d) show the different stages of the cycle which is represented in the T-S diagram shown in FIG. 9. The heat balance for a constant pressure turbine is represented by the curves through points 1, 2, 3 and 4. The heat balance for the compound turbine of the invention is represented by the curves through points 1, 8, 7, 9, 5 and 6.

According to calculations, the invention will yield a higher theoretical thermal efficiency than a conventional constant flow turbine. As can be seen in FIG. 9, high efficiency is attributed to the increased pressure of the excess gas mixture prior to entering the turbine. This pressure is achieved by combustion of a stoichiometric mixture, the expanding gases of which are cooled by mixing with a progressively diminishing amount of excess air compressed to the desired turbine entrance pressure. This exchange of heat follows the $P_5$ iso-bar which cuts the $T_3$ isotherm at points 5 and 3. The lower temperature at point 6 as compared with the temperature at point 4 is indicative of a better thermal efficiency in the compound turbine of the invention as compared with the constant pressure gas turbine.

The modification in FIGS. 10-14 is illustrated diagrammatically, showing the relationship of a power cylinder and an angularly offset pressure regulator cylinder. The engine may have one or more such cylinder pairs. In this embodiment, the power cylinder 61 has a power piston 62 reciprocable therein. The piston 62 covers the air intake port 63 in the side wall of cylinder 61 until the piston nears the bottom of its power stroke. As the piston rises on the compression stroke, it closes off the air intake port 63.

The pressure regulator cylinder 64 is angularly disposed with relation to power cylinder 61, e.g., about a 90°±15° rotation. A 90° rotation is shown in the illustrated embodiment. The pressure regulator piston 65 has an exhaust port 66 extending diagonally from its upper side to the cylindrical wall of the piston. This port communicates temporarily with the exhaust port 67 in the side wall of the pressure regulation cylinder 64 when the piston 65 is at the top of its stroke.

The piston rods 68, 69, respectively, of the power piston 61 and the pressure regulator piston 65 are journalled on the crankshaft at the same or substantially the same point 70, e.g., on the same throw of the crankshaft. The crankshaft is shown diagrammatically in FIGS. 10-13 by the circle depicting the orbital path of the throw of the crankshaft to which the piston rods are connected.

On the combustion stroke, fuel injected through fuel injector 71 is fired, and power piston 61 begins its power stroke. The combustion gases exert their full force on piston 61 until its upper edge passes the power cylinder exhaust port 72 at the end of passage 73.

During the power stroke of piston 61, the pressure regulator piston 65 moves toward the top of its stroke, compressing air in the pressure regulator cylinder.

In the power-exhaust stage (FIG. 11), hot combustion gases flow through passage 73 into the cylinder head 74 of pressure regulator cylinder 65. These hot gases mix with the compressed air in the pressure regulator cylinder, and the mixture of gases is vented or exhausted through passage 66 and exhaust port 67. The combustion gases, mixed with the cooler air, may be used to drive a turbine of the compound turbine engines herein described.

As the crankshaft continues to rotate, the power piston 62 moves radially inwardly to unblock air intake port 63 while the pressure regulator piston moves inwardly on its suction stroke. The passage 66 and exhaust port 67 lose their communication, and a lower pressure develops in pressure regulator piston 64 as piston 65 moves radially inwardly. Air is drawn through port 63, cylinder 61 and passage 73 to sweep out residual combustion gases. The cycle is then repeated.

Figure 14:
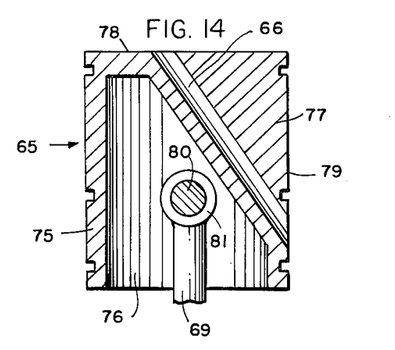
FIG. 14 is a cross-sectional view of another embodiment of a pressure regulator piston.

The pressure regulator piston 65 comprises a cylinder body 75 having a hollow part 76 open at the underside thereof. An upper corner 77 of the piston is solid and has the diagonal passage 66 therethrough from top wall 78 to the cylindrical wall 79. The hollow part 76 has a rod 80 rigidly mounted therein and extending thereacross, on which rod is journalled the bearing 81 of piston rod 69.

The regulator piston in this embodiment performs the added function of opening and closing the gas exit orifice to the turbine. This is a highly desirable arrangement in that the piston acts as the moving part of a simple and leakproof valve during compression of the excess air in the regulation cylinder.

The gas discharge nozzle for the turbine shown in FIGS. 15-18 for the pressure regulation cylinders in the previously described embodiments communicates with a gas discharge port in the cylindrical wall, e.g., a port 82 in the cylindrical wall 83 of the pressure regulation cylinder. The nozzle comprises a flanged, hollow body 84 fixedly attached to wall 83. The downstream end of the body 84 has fixedly attached thereto by bolts or the like (not shown) a cap ring 85. A nozzle 86 having a passage 87 tapering in the downstream direction is pivotally mounted in the body 84. The pivotal movement is provided in the illustrated case by a spherical portion 88 on the nozzle. The spherical portion is seated in an annular ball seat 89 provided in body 84 and cap ring 85 to provide a ball seat mounting for the ball of the nozzle.

The gas stream from the the nozzle is directed laterally against the blades 90 of the turbine 91 and the stator blade or blades 92.

Figure 15:
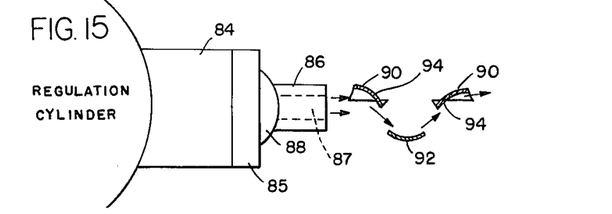
FIGS. 15 and 16 are semi-diagrammatic views in top plan and side elevation, respectively, of an embodiment of an adjustable gas discharge nozzle for a regulator cylinder and a part of a turbine.
Figure 16:
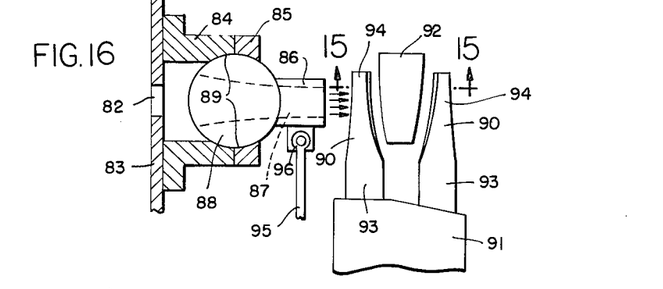
Figure 17:
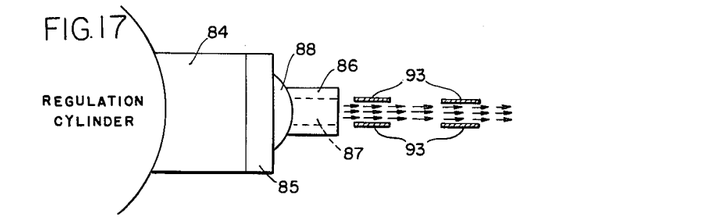
FIGS. 17 and 18 are similar views of said nozzle and turbine in a different adjusted position of said nozzle.
Figure 18:
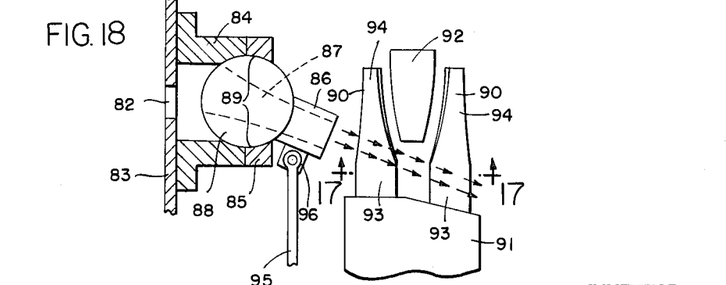

The turbine blades 90 each comprises a flat plate base segment 93 substantially parallel to the gas stream and a radially outer portion 94 which is twisted into a transversely curvate form as shown in FIGS. 15 and 16. The stator blades 92 are curved transversely, and extend radially inwardly between the curvate portions 94.

When the nozzle is positioned as shown in FIGS. 15 and 16, the gas stream is directed against the radially outer, curvate portions 94 of the blades 90 and against the stator blades. Gas flow in the turbine is substantially as shown in FIG. 15 whereby the gas stream exerts a driving force on the turbine. When the nozzle is pivoted to direct the gas stream across the flat, base segments 93 of the turbine blades and below the edge of the stator vane or vanes (FIGS. 17 and 18), the main gas stream from nozzle 86 is substantially parallel with the base segments 93. The gas stream at this orientation of the gas nozzle 86 exerts no driving force on the turbine 91 but rather provides a braking action.

The nozzle is moved between the above-described orientations by a rod or link 95 connected by hinge joint 96 to the nozzle 86. The rod itself may be operated by a manually controlled linkage, a linkage connected to the fuel feed control of the engine, e.g., a pedal such as commonly used in automobiles, centrifugal weights controlled by the gasifier speed, or pressure responsive mechanism responsive to pressure differences in the gasified cylinders.

It is though that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A compound engine comprising a two cycle engine with a combustion cylinder and a pressure regulator cylinder, a power piston reciprocable in said combustion chamber and operatively connected to a crankshaft, the cylindrical side wall of said combustion cylinder having an air intake port therein which is covered and uncovered by said piston as it reciprocates, said port being uncovered at the end portion of the power stroke and initial portion of the compression stroke of said piston to provide air intake at this portion of the stroke, and being covered during the compression, combustion and power-exhaust portions of the power piston cycle, a second piston reciprocable in said pressure regulator cylinder, exhaust passage means connecting the top portion of said pressure regulator cylinder with a second port in the cylindrical side wall of said combustion cylinder, said second port being covered by said power piston only during the end portion of the compression stroke and the initial portion of the power stroke after combustion and being uncovered during the following, power-exhaust portion of the power stroke, the air intake end portion of said power stroke, and the initial portion of the compression stroke, said pressure regulator cylinder having an exhaust port in the cylindrical side wall, said second piston having a passage therein opening into the top portion of said second cylinder and adapted to be aligned with said last-mentioned port during a portion only of the stroke of said second piston and means reciprocating said second piston in timing relationship to said first-mentioned piston to align said passage of said second piston with said last-mentioned port during only the power-exhaust portion of the stroke of said power piston and when said second piston is in the area of maximum compression in said pressure regulator cylinder, said second piston lagging said power piston to provide a timing in which said second piston is on its suction stroke during the air intake portion of the stroke of said power piston, whereby said suction stroke of said second piston sweeps intake air through said combustion cylinder and said exhaust passage means into said pressure regulator cylinder, said air which is swept into said pressure regulator cylinder being compressed therein by said second piston on its compression stroke while said second port of said combustion cylinder is closed by said power piston, a turbine, and means for discharging the resulting mixture of exhaust gases and compressed air exiting through said port of said pressure regulator piston into said turbine.

2. A compound turbine engine as claimed in claim 1 wherein said turbine has turbine blades which are substantially flat at the radially inner, base portions thereof and transversely curvate at the radially outer portions thereof, and nozzle means for selectively directing the gas streams from said chambers against either said substantially flat portions or said curvate portions of said blades.

3. A compound turbine engine as claimed in claim 2 wherein said nozzle means comprises a gas discharge nozzle pivotally mounted adjacent said turbine blades and selectively pivotable to selectively direct the gas streams as aforedefined.

References Cited by the Examiner
UNITED STATES PATENTS

| | | | |
|---|---|---|---|
| 1,078,710 | 11/1913 | Weir | 60—54 |
| 2,239,922 | 4/1941 | Martinka. | |
| 2,522,649 | 9/1950 | Tenny | 123—65 |
| 2,660,401 | 11/1953 | Hull | 253—77 |
| 2,845,774 | 8/1958 | Bertin | 60—13 |
| 2,985,157 | 5/1961 | Venediger | 123—41.7 X |
| 3,032,969 | 5/1962 | Barnes | 60—30 |
| 3,071,122 | 1/1963 | Lieberherr | 60—13 X |

MARK NEWMAN, *Primary Examiner.*

JULUIS E. WEST, RICHARD B. WILKINSON,
*Examiners.*

N. E. ABRAMS, LAURENCE M. GOODRIDGE,
*Assistant Examiners.*